L. H. FLANDERS.
ELECTRICAL SYSTEM OF DISTRIBUTION.
APPLICATION FILED FEB. 23, 1911.

1,051,949.

Patented Feb. 4, 1913.

UNITED STATES PATENT OFFICE.

LOUIS H. FLANDERS, OF JENKINTOWN, PENNSYLVANIA.

ELECTRICAL SYSTEM OF DISTRIBUTION.

1,051,949.  Specification of Letters Patent.  Patented Feb. 4, 1913.

Application filed February 23, 1911. Serial No. 610,304.

*To all whom it may concern:*

Be it known that I, LOUIS H. FLANDERS, a citizen of the United States, and a resident of Jenkintown, Montgomery county, in the State of Pennsylvania, have invented certain new and useful Improvements in Electrical Systems of Distribution, of which the following is a specification.

My invention relates to systems in which a storage battery is employed for controlling the fluctuations of current or voltage on an electrical circuit. Where a battery is used for controlling fluctuations of load in such a circuit, it is usual to employ regulating apparatus adapted to refer to the battery all fluctuations above or below a certain predetermined value or average, the latter being carried by the generating source. In some cases, however, it is desirable to permit the generating source to carry a certain proportion of the fluctuations, as well as the average load and limit the operation of the battery to those fluctuations which are in excess of a certain value. The operation of the battery in the discharge direction can be limited by adjusting the regulating apparatus so as to increase the average load on the source, but if the regulating apparatus is designed to hold the load on the source substantially constant as is usually the case, any adjustment which fixes the load on the source at some value in excess of the average demand, while restricting the discharge of the battery, will produce a corresponding increase in the charge and give rise to excessive overcharging.

The object of my invention is to provide means for permitting the adjustment of the regulating apparatus for any desired load on the generator in excess of the average demand without causing excessive charging of the battery at periods of light loads. To this end I provide, in addition to the usual regulating apparatus, a device responsive to the battery voltage for limiting the operation of the regulating apparatus whenever the battery voltage reaches a certain maximum value, this device, however, leaving the ordinary regulating apparatus free to operate so long as the battery voltage is below this limiting value.

My invention will be more clearly understood by reference to the following description taken in connection with the accompanying drawings in which—

Figure 1:
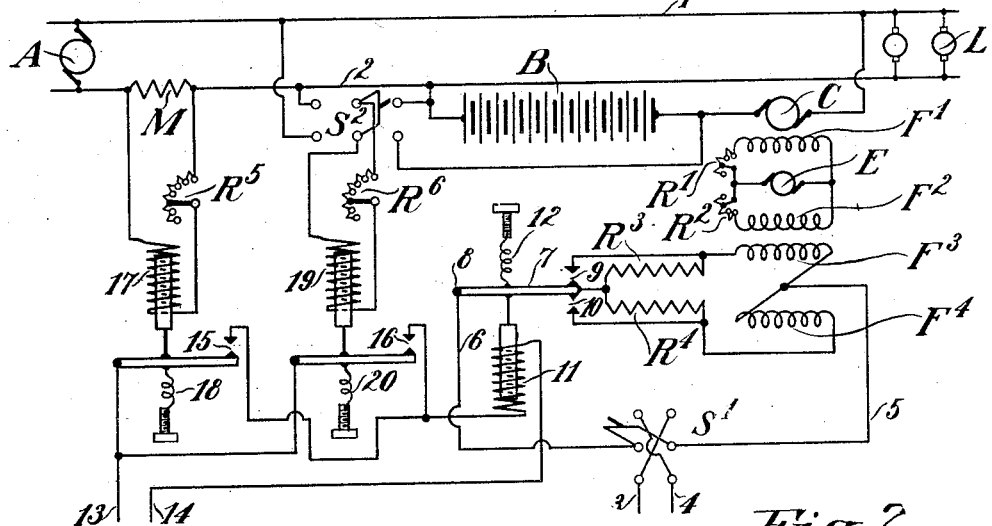
Figure 2:
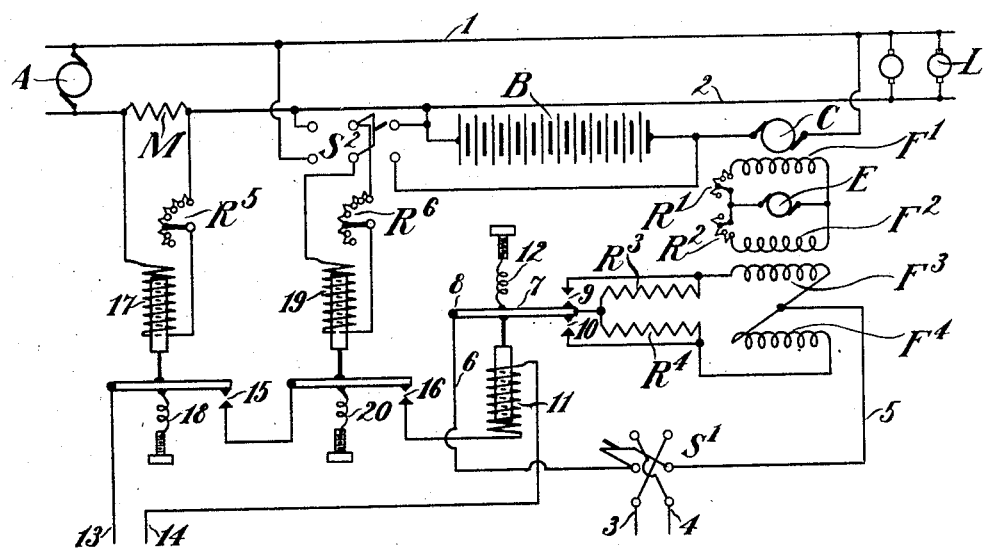

Figure 1 illustrates an embodiment of my invention applied to a system of direct current distribution, while Fig. 2 illustrates a system similar to Fig. 1, but modified in respect to certain connections of the regulating apparatus.

Referring to Fig. 1, A is a source of direct current connected to conductors 1—2 which supply translating devices, such as the motors L constituting a fluctuating load. Across the conductors 1—2 is connected a storage battery B with its booster C in series therewith. The field winding $F^1$ of the booster C is controlled by the exciter E. The booster C and exciter E may be driven by any suitable means not shown on the drawing. The exciter E is provided with three field windings, one of these, $F^2$, is connected directly across the terminals of the exciter. The other two field windings, $F^3$ and $F^4$ are connected in parallel to any suitable source of excitation, as, for example, the circuit 3—4, by means of conductors 5 and 6. In series with field winding $F^3$ is a resistance $R^3$ and in series with field winding $F^4$ is a resistance $R^4$. The field windings $F^3$ and $F^4$ are wound differentially with respect to each other and are so designed that when the corresponding resistances $R^3$ and $R^4$ are interposed, the two field windings will exactly neutralize each other and their resultant excitation will be zero. The field winding $F^2$ is of such strength that it alone will not build up voltage in the exciter E. A reversing switch $S^1$ is shown in the circuit of the field winding $F^3$ and $F^4$ for reversing the polarity of the current supplied to these windings. A lever 7 pivoted at 8 is arranged to make contact at either 9 or 10 according to whether the lever is raised or lowered, these contacts short-circuiting the resistances $R^3$ or $R^4$, respectively. The movement of the lever 7 is controlled by the core of a solenoid 11 opposed by a spring 12. Exciting current for the solenoid 11 is supplied from any suitable source, such as the circuit 13—14 whenever either one of two contacts 15 or 16 is closed. Contact 15 is closed by the operation of an electro-magnet 17 opposed by a spring 18. The winding of the electro-magnet 17 is connected across a resistance M connected into conductor 2 between the generating source A and the battery B. The contact 16 is closed by an electro-magnet 19 opposed by spring 20. The winding of the electro-magnet 19 may be connected by means of a double pole, double throw switch S² either to the terminals of the battery B or to the circuit 1—2.

The operation of the apparatus is as follows: The tension of the spring 18 may be adjusted to balance the pull of the electromagnet 17 at any predetermined load on the generator A. If the load on the generator exceeds this value the pull of the magnet 17 will overpower the tension of the spring 18 and close the contact at 15, thus exciting the coil 11 and pulling the lever 7 to its lower position making contact at 10. This will short-circuit the resistance R⁴ causing the field F⁴ of the exciter E to predominate over F³ and producing voltage in the direction to cause the battery to discharge. The rise in voltage of the exciter E will send current through the field winding F² in the direction to increase the effect of the field winding F⁴. If the contact at 10 remains closed for a sufficient length of time the voltage of the exciter E will build up to produce the maximum battery discharge. As soon, however, as the discharge from the battery B has reached a sufficient value to reduce the load on the source A below that for which the spring 18 is adjusted, the tension of this spring will predominate over the pull of the magnet 17, and the contact at 15 will be opened thus releasing the core of the solenoid 11 and breaking the contact at 10 at the same time closing the contact at 9. This will short-circuit the resistance R³ causing the field winding F³ to predominate over F⁴ and tending to reduce the excitation of exciter E. If the contact at 9 remains closed for a sufficient length of time, the voltage of the exciter E will be reduced to zero, and then reversed and built up in the opposite direction to cause the battery to charge. As soon, however, as the original voltage of the exciter E, produced by the closing of the contact at 10 has, by the opening of the contact 10 and the closing of that at 9, been sufficiently reduced to reduce the battery discharge sufficiently to increase the load on the source A above that for which the spring 18 is adjusted, the magnet 17 will again predominate and close the contact at 15, thus repeating the cycle of operation. It will be seen, therefore, that so long as the contact at 16 remains opened there will be an intermittent contact at 15 produced by slight changes of load on the source A above or below the value for which the apparatus is adjusted, producing a vibration of the lever 7 between the contacts 9 and 10, which will result in a mean excitation of the exciter E suitable for producing the amount of battery charge or discharge necessary to hold the load on the source A substantially constant. Assume now that the switch S² is thrown to connect the winding of the magnet 19 across the battery terminals and that the spring 20 is adjusted so that the pull of the magnet 19 will over-balance its tension when the battery voltage is slightly above the floating point. Whenever the demand on the circuit 1—2 is less than that for which the spring 18 is adjusted the regulating apparatus already described will cause the battery to charge to maintain the load on the source A. As soon, however, as the battery voltage rises by reason of this charge to a value above that for which the spring 20 has been adjusted, the contact 16 will be closed producing the same effect as the closing of the contact 15, since these two contacts are connected in parallel. This will reduce the charging current into the battery or even produce a discharge until the battery voltage falls below that for which the spring 20 is set, when the contact at 16 will again open. It will be seen, therefore, that whenever the demand on the circuit 1—2 exceeds that for which the spring 18 has been set the making and breaking of the contact 15 will control the operation of the battery so as to hold the load on the generator substantially constant by throwing on the battery all increase of demand above that value. Whenever the demand on the circuit 1—2 is less than that for which the spring 18 has been set, the battery will charge to maintain the load on the source A constant until the battery voltage reaches the critical point for which the spring 20 has been set whereupon the contact 16 will be intermittently opened and closed to hold the battery voltage at this point, permitting the load on the source A to decrease with any decrease in the demand at L, the contact at 15 remaining opened. The battery is thus prevented from receiving excessive charge during periods of light load while it is so controlled as to relieve the generator of all fluctuations of load above any desired predetermined value. If the source A should be disconnected from the circuit 1—2 at any time, the switch S² may be thrown to the left so as to connect the winding of the magnet 19 directly across the circuit 1—2. The magnet 17 will then be inoperative and the contact at 15 will be opened since there will be no flow of current through the resistance M. The magnet 19 will, however, operate to maintain a constant voltage across the circuit 1—2 by varying the voltage of the booster C to produce this result. During such operation the switch S¹ must be thrown over to reverse the polarity of the field windings F³ and F⁴, since an increase of pull of the magnet 19 due to an increase of voltage on the circuit 1—2 must now produce the opposite effect on the voltage of the booster C.

In Fig. 2 the arrangement of apparatus is exactly similar to that shown in Fig. 1 except that the contacts 15 and 16 are arranged in series instead of in parallel, and these contacts are arranged to be opened by the pull of their corresponding magnets and closed by corresponding springs instead of being closed by the magnets and opened by the springs, as in Fig. 1. Thus when the battery voltage is below the critical point at which magnet 19 comes into operation contact at 16 will remain closed and the operation of the battery will be controlled by the contact at 15. The contact at 15 will be opened when the load on the source A exceeds that for which the spring 18 is adjusted, and the opening of this contact will permit the spring 12 to raise the lever 7, making contact at 9, and short-circuiting the resistance R³. The polarity of the field windings F³ and F⁴ must in this case be reversed from that required in Fig. 1, so that the closing of the contact 9 will cause the battery to discharge and the closing of contact at 10 will cause the battery to charge. In other respects, and in the general results obtained, the operation of the arrangement shown in Fig. 2, will be the same as that in Fig. 1. Rheostats R⁵ and R⁶ are shown for controlling the excitation of the magnets 17 and 19 respectively, and rheostats R¹ and R² are interposed in the field winding F¹ and F² respectively, to permit the adjustment of these windings.

It will be obvious that many modifications in the details described above may be made without departing from the spirit of the invention.

What I claim, therefore, and desire to secure by Letters Patent is—

1. In combination, an electric circuit and its source, a storage battery and its booster in operative relation thereto, two devices for controlling the booster excitation, whereof one is adapted to maintain substantially constant load on the source, while the other is adapted to maintain substantially constant voltage at the battery terminals, said devices being mutually exclusive and selectively responsive to circuit conditions.

2. In combination, an electric circuit, a storage battery in operative relation thereto, apparatus including an exciting coil for regulating the battery charge and discharge, two devices for controlling the current in the exciting coil, whereof the first is adapted, in response to fluctuations of load on the circuit in excess of a certain value, to control the battery, to relieve the circuit of such fluctuations and simultaneously prevent the second device from producing any effect, while the second device is adapted, in response to battery voltage in excess of a certain value, to limit the charging current and simultaneously prevent the first device from having any effect.

3. In combination, an electric circuit, a storage battery in operative relation thereto, apparatus including an exciting coil for regulating the battery charge and discharge, a source of current for the exciting coil, and two vibratory contact devices interposed between the exciting coil and the source whereof one is responsive to load on the circuit and the other is directly responsive to the battery voltage.

4. In combination, an electric circuit, a storage battery in operative relation thereto, means for varying the voltage at the battery terminals to compel it to charge and discharge, including two devices, each adapted to reduce said voltage, whereof one is responsive to increase of load on the circuit above a certain value, and the other is directly responsive to increase of battery voltage above a certain value.

5. In combination, an electric circuit, a storage battery in operative relation thereto, apparatus for varying the ratio of battery voltage to circuit voltage, two mutually exclusive and selectively responsive devices for controlling said apparatus, whereof one is responsive to load and the other to voltage, and means for connecting the latter at will either across the battery or across the circuit.

6. In combination, an electric circuit, a storage battery in operative relation thereto, apparatus including an exciting coil for controlling the battery charge and discharge, two vibratory contact devices whereof one is actuated by current proportional to the load on the circuit, while the other is actuated by current proportional to the battery voltage, and connections from the coil to both devices whereby the operation of either excludes the other.

7. In combination, an electric circuit, a storage battery in operative relation thereto, apparatus including an exciting coil for controlling the operation of the battery in respect to the circuit and two vibratory contact devices each adapted to control the current in the exciting coil to reduce the voltage at the battery terminals, one in response to load on the circuit above a predetermined amount, and the other in response to battery voltage above a predetermined amount.

8. In combination, an electric circuit, a branch circuit containing a storage battery, apparatus including a field coil for controlling the operation of the battery in respect to the circuit, two vibratory contact devices, each adapted to control the current in the field coil, one in response to load on the circuit above a predetermined amount, and the other in response to voltage above a predetermined amount, means for connecting the latter device at will to respond either to
5 battery voltage or circuit voltage, and means for reversing the effect of the latter device on the current in the field coil.

In testimony whereof I have hereunto signed my name.

LOUIS H. FLANDERS.

Witnesses:
JOSEPH H. TRACY,
J. LESLIE WOODBRIDGE.